_United States Patent Office_

3,442,926
Patented May 6, 1969

3,442,926
SILYL SUBSTITUTED CHLORAMPHENICOL
Ronald L. Houtman, Parchment, Mich., assignor to The Upjohn Company, Kalamazoo, Mich., a corporation of Delaware
No Drawing. Filed Aug. 31, 1966, Ser. No. 576,239
Int. Cl. C07f 7/18; A61k 27/00
U.S. Cl. 260—448.8  3 Claims This invention relates to improved anti-infective compositions of matter and methods of their use, more particularly, silyl ethers of the antibacterial agent chloramphenicol, anti-infective pharmaceutical preparations thereof, and methods of use.

Chloramphenicol is a known broad spectrum antibiotic, D(−)-threo-1-p-nitrophenyl-2-dichloroacetamide-1,3-propanediol, represented by the following structural formula:

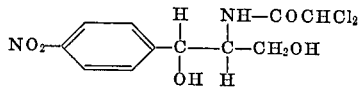

It has been shown to have beneficial anti-infective properties against gram-positive and gram-negative organisms, mycoplasma and rickettsiae. However, chloramphenicol is noticeably bitter to the taste. Also, in parenteral pharmaceutical applications, such as subcutaneously and intramuscularly, there has existed a problem of obtaining sufficiently prolonged blood levels of the active substance.

It has now been found, in accordance with the present invention, that the aforesaid unsolved problems in the prior art are ameliorated by preparation and use of silyl ethers of chloramphenicol. These silyl ethers, in essentially pure crystalline form, not only retain the beneficial anti-infective properties and uses of chloramphenicol but provide improvement thereover, especially in respect to nonbitterness to the taste in suspension and activity when administered parenterally, for example in sterile vegetable oil solutions in which chloramphenicol is insufficiently soluble and in aqueous suspensions. Previously, vapor phase chromatography of trimethylsilyl derivatives of compounds related to chloramphenicol has been described without isolation of essentially pure crystalline compounds or awareness of any beneficial anti-infective properties. Shaw, Analytical Chemistry, vol. 35, No. 11, 1580–1582, October 1963.

Hence, the present invention provides as novel and useful compositions of matter, compounds represented by the formula

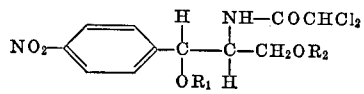

where $R_1$ is

whrein $R_3$ and $R_4$ are selected from the group consisting of lower alkyl containing 1 to 6 carbon atoms, inclusive, phenyl and benzyl, and $R_5$ is selected from the group consisting of lower alkyl containing 1 to 6 carbon atoms, inclusive, phenyl, benzyl and hydrogen; and $R_2$ is selected from the group consisting of hydrogen and the moiety

wherein $R_3$, $R_4$ and $R_5$ are as given.

Generally described, the manner and process of making the inventive compositions of matter is to react chloramphenicol with a silylating agent in a suitable solvent for the reactants and thereafter recover the silyl ether. A suitable solvent is pyridine, preferably anhydrous. The relative reactivity of the primary and secondary hydroxyl groups of chloramphenicol is such that the former is first silylated preferentially to yield silyl ethers in which $R_1$ is hydrogen and $R_2$ is the moiety

given above, for example

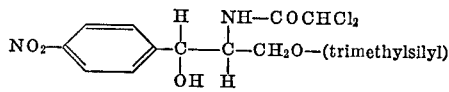

Both hydroxyl groups are silylated by use of excess silylating agent, for example, the bifunctional agent hexamethyldisilazane, with trimethylchlorosilane as a catalyst. Silylation of both hydroxyl groups occurs readily at ambient temperature, resulting in the formation of the di(trimethylsilyl)ether. The disubstituted ethers are readily converted to the monosubstituted ethers, wherein $R_2$ is hydrogen and $R_1$ is the moiety given above, for example bis-O-(trimethylsilyl)chloramphenicol to the mono-O-(trimethylsilyl) compound, under mildly acidic conditions, for example 0.4% acetic acid in methanol.

Other operable silylating agents not requiring the presence of a catalyst are known, for example diorganomonochlorosilanes such as diphenylmonochlorosilane, dibenzylmonochlorosilane, methylphenylmonochlorosilane, ethylphenylmonochlorosilane, and ethylbenzylmonochlorosilane, as in British Patent 822,970, referred to in Chemical Abstracts 44:658 (1950). Trisubstituted chlorosilanes from trimethyl to tribenzyl are known, synthesized by the action of limited amounts of the appropriate Grignard reagent on the silicon tetrahalide. Successive treatment with different Grignard reagents yields mixed trialkyl chlorosilanes. Cram and Hammond, Organic Chemistry, p. 257 (1959) and Sneed and Brasted, Comprehensive Inorg. Chem. 7:111–112 (1958). Organosilanes are also described in Roberts and Caserio, Basic Principles of Org. Chem., pp. 1182–1184 (1964). Silylation with the monofunctional agents goes readily without a catalyst being present.

For the purification of the ethers, the preferred method is to concentrate the reaction mixture to dryness and take up the residue in chloroform. The chloroform solution is washed thoroughly with water, and after the water phase is separated, the chloroform phase is filtered through silica gel. The filtered chloroform solution is evaporated to dryness to yield the purified crystalline silyl ether.

The following examples set forth how to make and use the present invention and the best mode contemplated of carrying out the invention but are not to be construed as limiting.

*Example 1.—Bis(trimethylsilyl)ether of chloramphenicol*

40 gm. of chloramphenicol is dissolved in 50 ml. of anhydrous pyridine. Silylation is accomplished by adding 200 ml. of hexamethyldisilazane and 100 ml. of trimethylchlorosilane and allowing the reaction to proceed at room temperature for about 2 hours. One liter of chloroform is added to the reaction mixture and the whole is then washed with water for about three hours to remove any impurity. After separation of the aqueous phase, the remaining chloroform solution is filtered through a silica gel pad to remove polar impurities. Thereafter, the chloroform solution is taken to dryness to yield 52.0 gm. of the essentially pure crystalline ether.

*Analysis.*—Calcd. for $C_{17}H_{28}Cl_2N_2O_5Si_2$: C, 43.68; H, 6.04; N, 5.99; Cl, 15.17. Found: C, 43.42; H, 6.09; N, 5.85; Cl, 15.15.

$[\alpha]_D$ (EtOH) +5° U.V. (EtOH)

| $\lambda$ | $\epsilon$ |
|---|---|
| sh. 212 | 12,200 |
| 272 | 10,300 |

Subcutaneously in mice, the $CD_{50}$ v. *Pasteurella multocida* is 21 mg./kg. (base equivalent being 15 mg./kg.). Orally the $CD_{50}$ is 15 mg./kg. (base equivalent being 10 mg./kg.). These activities represent substantial superiority over chloramphenicol controls.

Given orally in suspension to rats at a level of 500 mg./kg. for 5 days, the compound is well tolerated as measured by body weight, food conversion ratio, hemograms and gross pathological examination. The calculated $LD_{50}$ in mice intraperitoneally is 4123 mg./kg.; in rats orally it is >4000 mg./kg.

Depending upon the solvent used in recrystallizing the compound to essentially pure crystalline state, two crystal modifications are obtained:

Form I.—The crystal modifications upon crystallization from chloroform; a mull thereof in refined mineral oil exhibiting the following absorption bands in the infrared, in reciprocal centimeters:

| Band: | Intensity | Band: | Intensity |
|---|---|---|---|
| 3265 | M | 1253 | S |
| 3070 | W | 1218 | W |
| 3010 | M | 1197 | M |
| 2950 | [1]S | 1175 | W |
| 2920 | [1]S | 1112 | S |
| 2850 | [1]S | 1105 | S |
| 1695 | S | 1097 | S |
| 1670 | S | 1070 | S |
| 1643 | W | 1030 | S |
| 1609 | M | 1013 | M |
| 1603 | M | 960 | W |
| 1560 | M | 900 | M |
| 1545 | S | 870 | S |
| 1523 | S | 845 | S |
| 1492 | W | 812 | S |
| 1460 | [1]M | 800 | M |
| 1417 | W | 750 | S |
| 1375 | [1]M | 723 | M |
| 1346 | S | 700 | M |
| 1314 | M | 675 | M |
| 1288 | W | 665 | M |
| 1264 | S | | |

[1] Oil.

Form II.—The crystal modification upon crystallization from ethanol; a mull thereof in refined mineral oil exhibiting the following absorption bands in the infrared, in reciprocal centimeters:

| Band: | Intensity | Band: | Intensity |
|---|---|---|---|
| 3375 | S | 1219 | W |
| 3105 | W | 1211 | W |
| 3070 | W | 1195 | W |
| 2950 | [1]S | 1170 | W |
| 2920 | [1]S | 1123 | M |
| 2850 | [1]S | 1111 | M |
| 1697 | S | 1105 | M |
| 1606 | M | 1100 | S |
| 1594 | W | 1090 | S |
| 1561 | W | 1070 | S |
| 1533 | S | 1035 | M |
| 1518 | S | 1008 | W |
| 1484 | W | 979 | W |
| 1465 | [1]M | 975 | W |
| 1415 | W | 970 | W |
| 1405 | W | 905 | S |
| 1385 | W | 875 | S |
| 1375 | [1]W | 821 | M |
| 1344 | S | 805 | M |
| 1320 | W | 790 | M |
| 1312 | W | 755 | M |
| 1291 | W | 745 | M |
| 1272 | W | 720 | W |
| 1260 | M | 700 | W |
| 1250 | S | 690 | W |
| 1234 | W | 675 | W |

[1] Oil.

*Example 2.—Mono(trimethylsilyl)ether of chloramphenicol*

10 gm. of the product of Example 1 is dissolved in 250 ml. of methanol containing 0.4% acetic acid. The reaction mixture is stirred for 16 hours. Thereafter, the whole is evaporated to dryness and the residue is taken up in chloroform. The chloroform solution is washed several times in water, the aqueous phase separated, and the chloroform solution is taken to dryness to yield 8.1 gm. of the mono(trimethylsilyl)ether, essentially pure and crystalline.

*Analysis.*—Calcd. for $C_{14}H_{20}Cl_2N_2O_5Si$: C, 42.54; H, 5.10; N, 7.09; Cl, 17.94. Found: C, 42.50; H, 5.14; N, 7.33; Cl, 17.85.

$[\alpha]_D$ (EtOH) +9° U.V. (EtOH)

| $\lambda$ | $\epsilon$ |
|---|---|
| sh. 214 | 11,450 |
| 272 | 9,750 |

Subcutaneously in mice the $CD_{50}$ v. *Pasteurella multocida* is 30 mg./kg. (base equivalent being 27 mg./kg.). Orally the $CD_{50}$ is 17 mg./kg. (base equivalent being 15 mg./kg.). The subcutaneous activity represents substantial superiority over a chloramphenicol control.

Given orally in suspension to rats at a level of 500 mg./kg. for five days, the compound is well tolerated as measured by body weight, food conversion ratio, hemograms; and gross pathological examination. The calculated $LD_{50}$ in mice intraperitoneally is 684 mg./kg.; in rats orally it is >4000 mg./kg.

Etherification is at the secondary hydroxyl ($R_1$). Nuclear magnetic resonance supports the structure. A mull in refined mineral oil exhibits the following absorption bands in the infrared, in reciprocal centimeters.

| Band: | Intensity | Band: | Intensity |
|---|---|---|---|
| 3405 | S | 1195 | W |
| 3380 | S | 1176 | W |
| 3105 | W | 1116 | M |
| 3065 | W | 1106 | S |
| 3040 | W | 1085 | S |
| 2950 | [1]S | 1050 | S |
| 2920 | [1]S | 1030 | S |
| 2850 | [1]S | 1015 | M |
| 2720 | W | 970 | W |
| 1805 | W | 959 | W |
| 1682 | S | 898 | M |
| 1609 | M | 873 | S |
| 1600 | M | 850 | S |
| 1525 | S | 834 | M |
| 1494 | W | 829 | M |
| 1466 | M | 810 | M |
| 1459 | [1]M | 798 | W |
| 1415 | W | 770 | M |
| 1375 | [1]W | 750 | S |
| 1347 | S | 725 | W |
| 1318 | M | 702 | M |
| 1291 | M | 690 | W |
| 1255 | S | 679 | W |
| 1206 | M | 647 | M |

[1] Oil.

*Example 3.—Bis(triethylsilyl)ether*

100 mg. of chloramphenicol is dissolved in 10 ml. of anhydrous pyridine. 2.4 gm. of triethylchlorosilane is added and the reaction mixture is allowed to stand at room temperature for two hours. The mixture is evaporated to dryness and the residue is dissolved in chloroform. The chloroform solution is washed with water, and the wash water is discarded. The chloroform solution is filtered through a one centimeter pad of silica gel. The filtrate is evaporated to dryness to yield the bis(triethylsilyl) ether of chloramphenicol.

*Example 4.—Mono(triethylsilyl)ether*

The bis(triethylsilyl) ether of Example 3 is converted into the corresponding mono(triethylsilyl)ether of chloramphenicol according to the procedure of Example 2.

*Example 5.—Additional bis and mono-O-silyl ethers*

Following the procedures of Examples 3 and 4, but substituting the triethylchlorosilane by tri-n-propylchlorosilane, tri - n - butylchlorosilane, tripentylchlorosilane, trihexylchlorosilane, triphenylchlorosilane and tribenzylchlorosilane, there are obtained respectively the corresponding compounds: bis - O - (tri - n - propylsilyl) chloramphenicol, mono - O - (tri - n - propylsilyl)-chloramphenicol, bis - O - (tri - n - butylsilyl)chloramphenicol, mono - O - (tri - n - butylsilyl)chloramphenicol, bis - O - (tripentylsilyl)chloramphenicol, mono - O- (tripentylsilyl)chloramphenicol, bis - O - (trihexylsilyl) chloroamphenicol, mono - O - (trihexylsilyl)chloramphenicol, bis - O - (triphenylsilyl)chloramphenicol, mono - O - (triphenylsilyl)chloramphenicol, bis - O - (tribenzylsilyl)chloroamphenicol, and mono - O - (tribenzylsilyl)chloramphenicol.

*Example 6.—Additional silylethers*

Also following the procedure of Examples 3 and 4, but substituting the triethylchlorosilane by dimethylchlorosilane, diethylchlorosilane, di - n - propylchlorosilane, di-n - butylchlorosilane, dipentylchlorosilane, dihexylchlorosilane, diphenylchlorosilane, and dibenzylchlorosilane, there are obtained the corresponding bis and mono - O - (dialkylsilyl)chloramphenicols and the corresponding bis and mono - O - (diarylsilyl)chloramphenicols.

*Example 7.—Additional silyl ethers*

Mixed monochlorosilanes, such as dimethylethylchlorosilane, methylethylpentylchlorosilane, methyltri-n - propylchlorosilane, methylethylchlorosilane, phenylmethylchlorosilane, diphenylmethylchlorosilane, benzylphenylchlorosilane and the like are used to prepare the corresponding bis and mono(alkylsilyl) and (alkarylsilyl) compounds included within the scope of the concept and practice of the invention.

The novel silyl ethers, in effective amounts for antimicrobial and anti-infective action, are compounded into pharmaceutical compositions for oral and injectable use, for example, tablets, suspensions, granules, emulsions, capsules, syrups and elixirs; sterile oil dispersions, sterile aqueous suspensions and sterile powders for injection; and the like. In such compositions, pharmaceutical carriers, i.e., compatible excipients, diluents, preservatives and the like are used to form compositions consisting essentially of the respective silyl ether. Unitary dosage forms suitable for providing anti-infective action in mammals are preferred. They generally contain from about 125 mg. to about 1000 mg. of the essential active ingredient per solid unitary dosage form and from about 2.5% to about 40% by weight of liquid unitary dosage forms. These amounts are effective for anti-infective action.

The following pharmaceutical compositions are preferred embodiments of a pharmaceutical composition utilizing the silyl ethers of this invention.

*Example 8.—Aqueous suspension*

Ten liters, each ml. containing 60 mg. of mono(trimethylsilyl)chloramphenicol, is prepared according to the following formula:

| | | |
|---|---|---|
| Mono(trimethylsilyl)chloramphenicol | gm.. | 600 |
| Preservative | gm.. | 10 |
| Glycerin | ml.. | 3000 |
| Tragacanth powder | gm.. | 100 |
| Purified water, U.S.P., q.s. ad | ml.. | 10,000 |

The suspension provides an essentially tasteless preparation in contrast to the usually orally administered chloramphenicol.

*Example 9.—Oil solution*

A 10% w./v. solution of the bis(trimethylsilyl)chloramphenicol, sterilized as required, is prepared in a suitable vegetable oil, e.g., peanut oil. The solution is suited for intramuscular injection to provide sustained blood levels of active ingredient.

The foregoing anti-infective pharmaceutical compositions are exemplified using the mono and bis(trimethylsilyl)ethers of chloramphenicol. For these ethers, the other described silyl ethers of chloramphenicol are substituted in equivalent amounts to provide additional anti-infective pharmaceutical preparations with like beneficial results.

What is claimed is:

1. Essentially pure crystalline compositions of matter of the formula

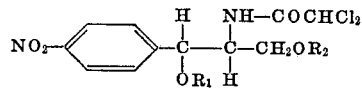

where $R_1$ is the moiety

wherein $R_3$ and $R_4$ are selected from the group consisting of lower alkyl containing 1 to 6 carbon atoms, inclusive, phenyl and benzyl, and $R_5$ is selected from the group consisting of lower alkyl containing 1 to 6 carbon atoms, inclusive, phenyl, benzyl, and hydrogen; and $R_2$ is selected from the group consisting of hydrogen and the moiety

wherein $R_3$, $R_4$ and $R_5$ are as given.

2. Essentially pure crystalline composition of matter according to claim 1 wherein $R_1$ and $R_2$ are trimethylsilyl.

3. Essentially pure crystalline composition of matter according to claim 1 wherein $R_1$ is trimethylsilyl and $R_2$ is hydrogen.

No references cited.

TOBIAS E. LEVOW, *Primary Examiner.*

J. P. PODGORSKI, *Assistant Examiner.*

U.S. Cl. X.R.

424—324